(12) United States Patent
Xu

(10) Patent No.: US 9,829,754 B2
(45) Date of Patent: Nov. 28, 2017

(54) PIXEL ARRAY, DISPLAY PANEL, AND DISPLAY DEVICE

(71) Applicant: Shenzhen China Star Optoelectronics Technology Co. Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 316 days.

(21) Appl. No.: 14/402,306

(22) PCT Filed: Sep. 24, 2014

(86) PCT No.: PCT/CN2014/087275
§ 371 (c)(1),
(2) Date: Nov. 19, 2014

(87) PCT Pub. No.: WO2016/041215
PCT Pub. Date: Mar. 24, 2016

(65) Prior Publication Data
US 2016/0266452 A1  Sep. 15, 2016

(30) Foreign Application Priority Data

Sep. 17, 2014 (CN) .......................... 2014 1 0476226

(51) Int. Cl.
*G02F 1/1335* (2006.01)
*G02F 1/1343* (2006.01)

(52) U.S. Cl.
CPC .. *G02F 1/134336* (2013.01); *G02F 1/133512* (2013.01); *G02F 1/133514* (2013.01); *G02F 2001/134345* (2013.01); *G02F 2201/52* (2013.01)

(58) Field of Classification Search
CPC ........... G02F 1/133514; G02F 2201/52; G02F 1/133512; G02F 2201/40
See application file for complete search history.

(56) References Cited

U.S. PATENT DOCUMENTS

2009/0015768 A1*  1/2009  Igeta ................. G02F 1/133512
                                                                349/106
2010/0245734 A1*  9/2010  Tanno ............... G02F 1/134363
                                                                349/106

* cited by examiner

*Primary Examiner* — Jia Pan
(74) *Attorney, Agent, or Firm* — Andrew C. Cheng

(57) ABSTRACT

Disclosed are pixel array, a display panel, and a display device. The pixel array includes a plurality of pixels distributed in matrix along a first direction and a second direction. Each pixel comprising three sub-pixels has different colors, the three sub-pixels are respectively named a first color sub-pixel, a second color sub-pixel, and a third color sub-pixel. In the pixels distributed in the first direction, adjacent two sub-pixels in adjacent two pixels have the same color, and the adjacent two sub-pixels having the same color in the adjacent two pixels shares a date line. A data line number required for the display panel is reduced, and the aperture ratio of the display panel is improved.

13 Claims, 5 Drawing Sheets

PIXEL ARRAY, DISPLAY PANEL, AND DISPLAY DEVICE

CROSS-REFERENCE TO RELATED APPLICATIONS

This application claims the priority benefit of Chinese Patent Application No. 201410476226.9, filed on Sep. 17, 2014, and entitle "PIXEL ARRAY, DISPLAY PANEL, AND DISPLAY DEVICE", the content of which is incorporated by reference herein in its entirety for all purposes.

FIELD

The present disclosure relates to the field of display, and particularly to a pixel, a display panel, and a display device with a higher aperture ratio.

BACKGROUND

Display panel, such as liquid crystal display (LCD), is a common used electronic device. The display panel is popularized by uses because it has characteristics such as low power consumption, small volume, light in weight. In the display panel in existing technology, a pixed is desined by three sub-pixels, and the pixel is used to display. The three sub-pixels are red sub-pixel, green sub-pixel, and blue sub-pixel respectively. Referring to FIG. 1, FIG. 1 is a schematic diagram of a pixel array of a display panel in the existing technology. In each row of the display panel, the red sub-pixel, the green sub-pixel, and the blue sub-pixel are arranged orderly and repeatedly. The sub-pixels in each column of the display panel are the same. As shown in FIG. 1, the sub-pixels in the first column on the left are red sub-pixels, the sub-pixels in the second column on the left are the green sub-pixels, the sub-pixels in the third column on the left are blue sub-pixels, and the sub-pixels in each columns are repeated as the first column on the left, the second column on the left and the third column on the left. When the display panel is drived, the sub-pixels in each column are drived by a data line. If a resolution of the display panel is m*n, the letter m is a row number of the pixels of the display panel, the letter n is a column number of the pixels of the display panel, then a data line number required for driving the display panel is 3*n. From the above description, it can be seen that the data line number required for driving the display panel is greater for a display panel having a particular resolution, and lead to a lower aperture ratio of the display panel in the existing technology.

SUMMARY

A pixel array is provided, a data line number required for the pixel array is reduced, and the aperture ratio of the display panel having the pixel array is improved In a first aspect, a pixel array is provided. The pixel array including: a plurality of pixels distributed in matrix along a first direction and a second direction, each pixel comprising three sub-pixels having different colors, the three sub-pixels being respectively named a first color sub-pixel, a second color sub-pixel, and a third color sub-pixel, in the pixels distributed in the first direction, adjacent two sub-pixels in adjacent two pixels having the same color, and the adjacent two sub-pixels having the same color in the adjacent two pixels sharing a date line.

In a first embodiment of the first aspect, wherein in the pixels distributed in the second direction, any adjacent three sub-pixels form a pixel.

Combined with a first embodiment of the first aspect, in a second aspect of the first aspect, wherein the pixels are periodically distributed by taking three pixels as a period in the first direction, the three pixels in a period are respectively named as a first pixel, a second pixel, and a third pixel, the first pixel comprises a first color sub-pixel, a second color sub-pixel, and a third color sub-pixel orderly distributed along the first direction; the second pixel comprises a third color sub-pixel, a first color sub-pixel, and a second color sub-pixel orderly distributed along the first direction; the third pixel comprises a second color sub-pixel, a third color sub-pixel, and a first color sub-pixel orderly distributed along the first direction.

Combined with the second embodiment of the first aspect, in a third embodiment of the first aspect, wherein the pixels are periodically distributed by taking three rows as a period in the second direction, the three rows in a period are respectively named as a first pixel row, a second pixel row, and a third pixel row, the first color sub-pixel of the pixel in the first pixel row is corresponding to the second color sub-pixel of the pixel in the second pixel row and the third color sub-pixel of the pixel in the third pixel row in the second direction, and the first color sub-pixel of the pixel in the first pixel row, the second color sub-pixel of the pixel in the second pixel row and the third color sub-pixel of the pixel in the third pixel row forms a pixel in the second direction; the second color sub-pixel of the pixel in the first pixel row is corresponding to the third color sub-pixel of the pixel in the second pixel row and the first color sub-pixel of the pixel in the third pixel row in the second direction, and the second color sub-pixel of the pixel in the first pixel row, the third color sub-pixel of the pixel in the second pixel row and the first color sub-pixel of the pixel in the third pixel row forms a pixel in the second direction; the third color sub-pixel of the pixel in the first pixel row is corresponding to the first color sub-pixel of the pixel in the second pixel row and the second color sub-pixel of the pixel in the third pixel row in the second direction, and the third color sub-pixel of the pixel in the first pixel row, the first color sub-pixel of the pixel in the second pixel row and the second color sub-pixel of the pixel in the third pixel row forms a pixel in the second direction.

In a fourth embodiment of the first aspect, wherein a black matrix is set between the adjacent two sub-pixels having the same color, and the data line is corresponding to the black matrix set between the adjacent two sub-pixels having the same color.

In a fifth embodiment of the first aspect, wherein there is no black matrix between the adjacent two sub-pixels in the adjacent two pixels, and the adjacent two sub-pixels in the adjacent two sub-pixels are connected to each other.

Combined with the fifth embodiment of the first aspect, in a sixth embodiment of the first aspect, wherein a data line is located between the adjacent two sub-pixels having the same color of the adjacent two pixels.

In a second aspect, a display panel is provided in the present disclosure. The display panel includes a substrate and a pixel array formed on the substrate, the pixel array comprising a plurality of pixels distributed in matrix along a first direction and a second direction, each pixel comprising three sub-pixels having different colors, the three sub-pixels being respectively named a first color sub-pixel, a second color sub-pixel, and a third color sub-pixel, in the pixels distributed in the first direction, adjacent two sub-pixels in adjacent two pixels having the same color, and the adjacent two sub-pixels having the same color in the adjacent two pixels sharing a date line.

In a first embodiment of the second aspect, wherein in the pixels distributed in the second direction, any adjacent three sub-pixels form a pixel.

Combined with the first embodiment of the second aspect, in a second embodiment of the second aspect, wherein the pixels are periodically distributed by taking three pixels as a period in the first direction, the three pixels in a period are respectively named as a first pixel, a second pixel, and a third pixel, the first pixel comprises a first color sub-pixel, a second color sub-pixel, and a third color sub-pixel orderly distributed along the first direction; the second pixel comprises a third color sub-pixel, a first color sub-pixel, and a second color sub-pixel orderly distributed along the first direction; the third pixel comprises a second color sub-pixel, a third color sub-pixel, and a first color sub-pixel orderly distributed along the first direction.

Combined with a second embodiment of the second aspect, in a third embodiment of the second aspect, wherein the pixels are periodically distributed by taking three rows as a period in the second direction, the three rows in a period are respectively named as a first pixel row, a second pixel row, and a third pixel row, the first color sub-pixel of the pixel in the first pixel row is corresponding to the second color sub-pixel of the pixel in the second pixel row and the third color sub-pixel of the pixel in the third pixel row in the second direction, and the first color sub-pixel of the pixel in the first pixel row, the second color sub-pixel of the pixel in the second pixel row and the third color sub-pixel of the pixel in the third pixel row forms a pixel in the second direction; the second color sub-pixel of the pixel in the first pixel row is corresponding to the third color sub-pixel of the pixel in the second pixel row and the first color sub-pixel of the pixel in the third pixel row in the second direction, and the second color sub-pixel of the pixel in the first pixel row, the third color sub-pixel of the pixel in the second pixel row and the first color sub-pixel of the pixel in the third pixel row forms a pixel in the second direction; the third color sub-pixel of the pixel in the first pixel row is corresponding to the first color sub-pixel of the pixel in the second pixel row and the second color sub-pixel of the pixel in the third pixel row in the second direction, and the third color sub-pixel of the pixel in the first pixel row, the first color sub-pixel of the pixel in the second pixel row and the second color sub-pixel of the pixel in the third pixel row forms a pixel in the second direction.

In a fourth embodiment of the second aspect, wherein there is no black matrix between the adjacent two sub-pixels in the adjacent two pixels, and the adjacent two sub-pixels in the adjacent two sub-pixels are connected to each other.

Combined with the fourth embodiment of the second aspect, in a fifth embodiment of the second aspect, wherein a data line is located between the adjacent two sub-pixels having the same color of the adjacent two pixels.

In a third aspect, a display device is provided. The display device includes a display panel. The display panel including a substrate and a pixel array formed on the substrate, the pixel array comprising a plurality of pixels distributed in matrix along a first direction and a second direction, each pixel comprising three sub-pixels having different colors, the three sub-pixels being respectively named a first color sub-pixel, a second color sub-pixel, and a third color sub-pixel, in the pixels distributed in the first direction, adjacent two sub-pixels in adjacent two pixels having the same color, and the adjacent two sub-pixels having the same color in the adjacent two pixels sharing a date line.

In a first embodiment of the third aspect, wherein in the pixels distributed in the second direction, any adjacent three sub-pixels form a pixel.

Combined with the first embodiment of the third aspect, in a second embodiment of the third aspect, wherein the pixels are periodically distributed by taking three pixels as a period in the first direction, the three pixels in a period are respectively named as a first pixel, a second pixel, and a third pixel, the first pixel comprises a first color sub-pixel, a second color sub-pixel, and a third color sub-pixel orderly distributed along the first direction; the second pixel comprises a third color sub-pixel, a first color sub-pixel, and a second color sub-pixel orderly distributed along the first direction; the third pixel comprises a second color sub-pixel, a third color sub-pixel, and a first color sub-pixel orderly distributed along the first direction.

Combined with the second embodiment of the third aspect, in a third embodiment of the third aspect, wherein the pixels are periodically distributed by taking three rows as a period in the second direction, the three rows in a period are respectively named as a first pixel row, a second pixel row, and a third pixel row, the first color sub-pixel of the pixel in the first pixel row is corresponding to the second color sub-pixel of the pixel in the second pixel row and the third color sub-pixel of the pixel in the third pixel row in the second direction, and the first color sub-pixel of the pixel in the first pixel row, the second color sub-pixel of the pixel in the second pixel row and the third color sub-pixel of the pixel in the third pixel row forms a pixel in the second direction; the second color sub-pixel of the pixel in the first pixel row is corresponding to the third color sub-pixel of the pixel in the second pixel row and the first color sub-pixel of the pixel in the third pixel row in the second direction, and the second color sub-pixel of the pixel in the first pixel row, the third color sub-pixel of the pixel in the second pixel row and the first color sub-pixel of the pixel in the third pixel row forms a pixel in the second direction; the third color sub-pixel of the pixel in the first pixel row is corresponding to the first color sub-pixel of the pixel in the second pixel row and the second color sub-pixel of the pixel in the third pixel row in the second direction, and the third color sub-pixel of the pixel in the first pixel row, the first color sub-pixel of the pixel in the second pixel row and the second color sub-pixel of the pixel in the third pixel row forms a pixel in the second direction.

In a fourth embodiment of the third aspect, wherein there is no black matrix between the adjacent two sub-pixels in the adjacent two pixels, and the adjacent two sub-pixels in the adjacent two sub-pixels are connected to each other.

Combined with the fourth embodiment of the third aspect, in a fifth embodiment of the third aspect, wherein a data line is located between the adjacent two sub-pixels having the same color of the adjacent two pixels.

In the pixel array, the display panel, and the display device provided in the embodiments of present disclosure, the adjacent two sub-pixels in the adjacent two pixels have the same color, and the adjacent two sub-pixels having the same color in the adjacent two pixels shares a data line. The adjacent two sub-pixels having the same color in the adjacent two pixels of the pixel array, and the adjacent two sub-pixels having the same color in the adjacent two pixels shares a date line. Thus, compared with the existing technology, a data line number required for the display panel for the display panel is reduced, and the aperture ratio of the display panel is improved.

BRIEF DESCRIPTION OF THE DRAWINGS

In order to make embodiments of present disclosure more clearly, the drawings which are needed in the embodiments of present disclosure are described simply as follows. It is obviously, the drawings described as the follows are only exemplary embodiments of present disclosure. To a person of ordinary skill in the art, under premise of no creative work, other drawings may be obtained according to the drawings.

DETAILED DESCRIPTION OF ILLUSTRATED EMBODIMENTS

In order to make embodiments of present disclosure more clearly, the drawings which are needed in the embodiments of present disclosure are described simply as follows. It is obviously, the drawings described as the follows are only exemplary embodiments of present disclosure. To a person of ordinary skill in the art, under premise of no creative work, other drawings may be obtained according to the drawings. Based on the embodiments of the present disclosure, under the premise of no creative work, other embodiments obtained by the person with ordinary skills in the art are belong to a protection scope of the present disclosure.

Figure 1:
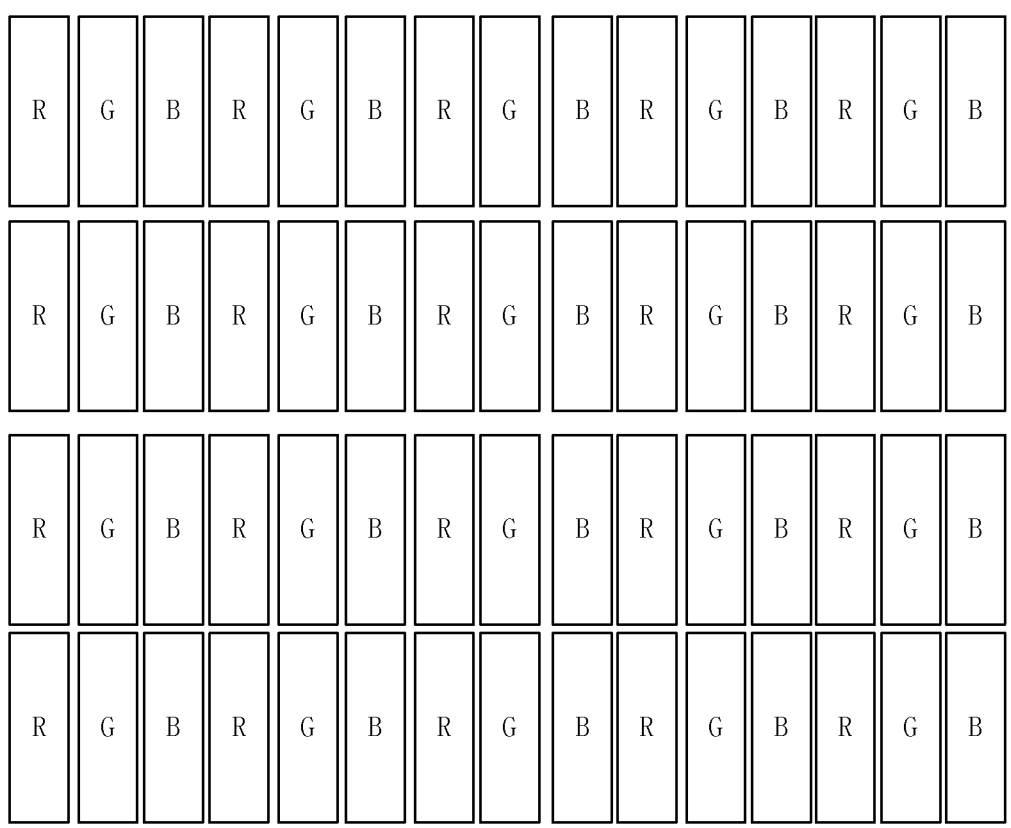
FIG. 1 is a schematic diagram of a pixel array of a display panel in the existing technology.
Figure 2:
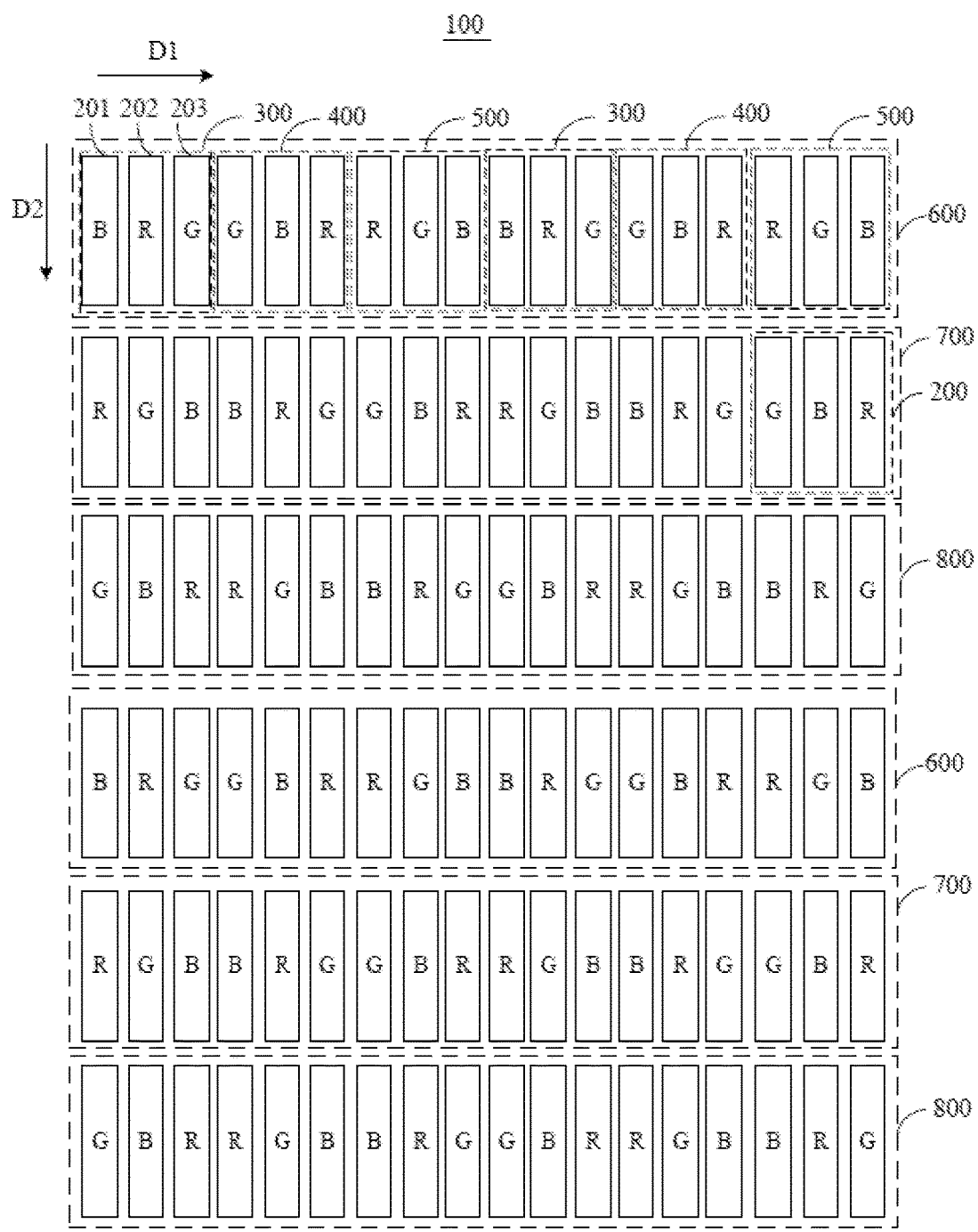
FIG. 2 is a schematic diagram of a pixel array according to a first embodiment of present disclosure.

Referring to FIG. 2, FIG. 2 is a schematic diagram of a pixel array according to a first embodiment of present disclosure. The pixel array 100 includes a plurality of pixels 200 which are distributed in matrix along a first direction D1 and a second direction D2. Each pixel 200 includes three sub-pixels having different colors. For a convenient description, the three sub-pixels having different colors are respectively named as a first color sub-pixel 201, a second color sub-pixel 202, and a third color sub-pixel 203. In the pixels 200 distributed in the first direction D1, adjacent two sub-pixels in adjacent two pixels have the same color, and the adjacent two sub-pixels having the same color in the adjacent two pixels share a data line. The adjacent two sub-pixels in adjacent two pixels have the same color means that a pixel is adjacent to another pixel, one sub-pixel of the pixel is adjacent to one sub-pixel of the adjacent pixel and has the same color as the sub-pixel of the adjacent pixel.

In the pixels 200 distributed in the second direction D2, any adjacent three sub-pixels form a pixel 200.

In an embodiment of present disclosure, the first direction D1 is a row direction and the second direction D2 is a column direction. In another embodiment of present disclosure, the first direction D1 is a column direction and the second direction D2 is a row direction. In the embodiment, the first color sub-pixel 201 is a blue sub-pixel, and the first color sub-pixel 201 is represented by a letter B for a convenient marking in FIG. 2. The second color sub-pixel 202 is a red sub-pixel, and the second color sub-pixel 202 is represented by a letter R for a convenient marking in FIG. 2. The third color sub-pixel 203 is a green color sub-pixel, and the third color sub-pixel 203 is represented by a letter G for a convenient marking in FIG. 2.

It is understood that in another embodiment, the first color sub-pixel 201 is a green sub-pixel, the second color sub-pixel 202 is a red sub-pixel, and the third color sub-pixel 203 is a blue sub-pixel. In yet another embodiment, the first color sub-pixel 201 is a green sub-pixel, the second color sub-pixel 202 is a blue sub-pixel, and the third color sub-pixel 203 is a red sub-pixel. And the first color sub-pixel 201, the second color sub-pixel 202, and the third color sub-pixel 203 are not limited to the above description, the first color sub-pixel 201, the second color sub-pixel 202, and the third color sub-pixel 203 can be other combinations of red sub-pixel, blue sub-pixel and green sub-pixel.

The pixel array 100 provided in the present disclosure is illustrated by take the resolution of the display panel is m*n for example. The letter m is a row number of the pixels of the display panel and the letter n is a column number of the pixels of the display panel. In the existing technology, the data line number required for driving the display panel is 3*n. In the embodiment of present disclosure, the date line number required for driving the display panel is 2*n+1, because the adjacent two sub-pixels having the same color in the adjacent two pixels share a date line. The letter n is a positive integer and n>1, thus, (2*n+1)<3*n. In present disclosure, the adjacent two sub-pixels of the adjacent two pixels are set as the same color, and the adjacent two sub-pixels having the same color of the adjacent two pixels are shared a data line. Thus, a data line number required for the display panel is reduced, and the aperture ratio of the display panel is improved.

In the first direction D1, the pixels 200 are periodically distributed by taking three pixels as a period. For a convenient description, the three pixels in a period are respectively named as a first pixel 300, a second pixel 400, and a third pixel 500. In the first row of the pixels, the first pixel 300 includes a first color sub-pixel 201, a second color sub-pixel 202, and a third color sub-pixel 203 orderly distributed along the first direction D1. The second pixel 400 includes a third color sub-pixel 203, a first color sub-pixel 201, and a second color sub-pixel 202 orderly distributed along the first direction D1. The third pixel 500 includes a second color sub-pixel 202, a third color sub-pixel 203, and a first color sub-pixel 201 orderly distributed along the first direction D1.

In the embodiment, the first color sub-pixel 201 is a blue sub-pixel B, the second color sub-pixel 202 is a red sub-pixel R, and the third color sub-pixel 203 is a green sub-pixel G. Thus, in the pixels of the first row, the first pixel 300 includes a blue sub-pixel B, a red sub-pixel R, and a green sub-pixel G orderly distributed along the first direction D1. The second pixel 400 includes a green sub-pixel G, a blue sub-pixel B, and a sub-pixel R orderly distributed along the first direction D1. The third pixel 500 includes a red sub-pixel R, a green sub-pixel G, and a blue sub-pixel B orderly distributed along the first direction D1. Moreover, the pixels 200 in the first row are periodically distributed by taking the first pixel 300, the second pixel 400, and the third pixel 500 as a period in the first direction D1. The pixels 200 in the second row are periodically distributed by taking the third pixel 500, the first pixel 300, and the second pixel 400 as a period in the first direction D1. Moreover, the third pixel 500 in the second row is corresponding to the first pixel 300 in the first row, that is, the third pixel 500 in the second row is in the same column with the first pixel 300 in the first row. The first pixel 300 in the second row is corresponding to the second pixel 400 in the first row, that is, the first pixel 300 in the second row is in the same column with the second pixel 400 in the first row. The second pixel 400 in the second row is corresponding to the third pixel 500 in the first row, that is, the second pixel 400 in the second row is in the same column with the third pixel 500 in the first row. The pixels 200 in the third row are periodically distributed by taking the second pixel 400, the third pixel 500, and the first pixel 300 as a period in the first direction D1, moreover, the second pixel 400 in the third row is corresponding to the first pixel 300 in the first row and the third pixel 500 in the second row, that is, the second pixel 400 in the third row is in the same column with the first pixel 300 in the first row and the third pixel 500 in the second row. The third pixel 500 in the third row is corresponding to the second pixel 400 in the first row and the first pixel 300 in the second row, that is, the third pixel 500 in the third row is in the same column with the second pixel 400 in the first row and the first pixel 300 in the second row. The first pixel 300 in the third row is corresponding to the third pixel 500 in the first row and the second pixel 400 in the second row, that is, the first pixel 300 in the third row is in the same column with the third pixel 500 in the first row and the second pixel 400 in the second row.

In the second direction D2, the pixels 200 are periodically distributed by taking three rows as a period. For a convenient description, the three rows in a period are respectively named as a first pixel row 600, a second pixel row 700, and a third pixel row 800. That is, the pixels 200 are periodically distributed by taking the first pixel row 600, the second pixel row 700, and the third pixel row 800 as a period in the second direction D2.

The first color sub-pixel 201 of the pixel 200 in the first pixel row 600 is corresponding to the second color sub-pixel 202 of the pixel 200 in the second pixel row 700 and the third color sub-pixel 203 of the pixel 200 in the third pixel row 800 in the second direction D2, and the first color sub-pixel 201 of the pixel 200 in the first pixel row 600, the second color sub-pixel 202 of the pixel 200 in the second pixel row 700 and the third color sub-pixel 203 of the pixel 200 in the third pixel row 800 form a pixel 200 in the second direction D2. In the embodiment, the first color sub-pixel 201 of the pixel 200 in the first pixel 600 is in the same column with the second color sub-pixel 202 of the pixel 200 in the second pixel row 700 and the third color sub-pixel 203 of the pixel 200 in the third pixel row 800. The second color sub-pixel 202 of the pixel 200 in the first pixel row 600 is corresponding to the third color sub-pixel 203 of the pixel 200 in the second pixel row 700 and the first color sub-pixel 201 of the pixel 200 in the third pixel row 800 in the second direction D2, and the second color sub-pixel 202 of the pixel 200 in the first pixel row 600, the third color sub-pixel 203 of the pixel 200 in the second pixel row 700 and the first color sub-pixel 201 of the pixel 200 in the third pixel row 800 form a pixel 200 in the second direction D2. In the embodiment, the second color sub-pixel 202 of the pixel 200 in the first pixel row 600 is in the same column with the third color sub-pixel 203 of the pixel 200 in the second pixel row 700 and the first color sub-pixel 201 of the pixel 200 in the third pixel row 800. The third color sub-pixel 203 of the pixel 200 in the first pixel row 600 is corresponding to the first color sub-pixel 201 of the pixel 200 in the second pixel row 700 and the second color sub-pixel 202 of the pixel 200 in the third pixel row 800 in the second direction D2. In the embodiment, the third color sub-pixel 203 of the pixel 200 in the first pixel row 600 is in the same column with the first color sub-pixel 201 of the pixel 200 in the second pixel row 700 and the second color sub-pixel 202 of the pixel 200 in the third pixel row 800.

Figure 3:
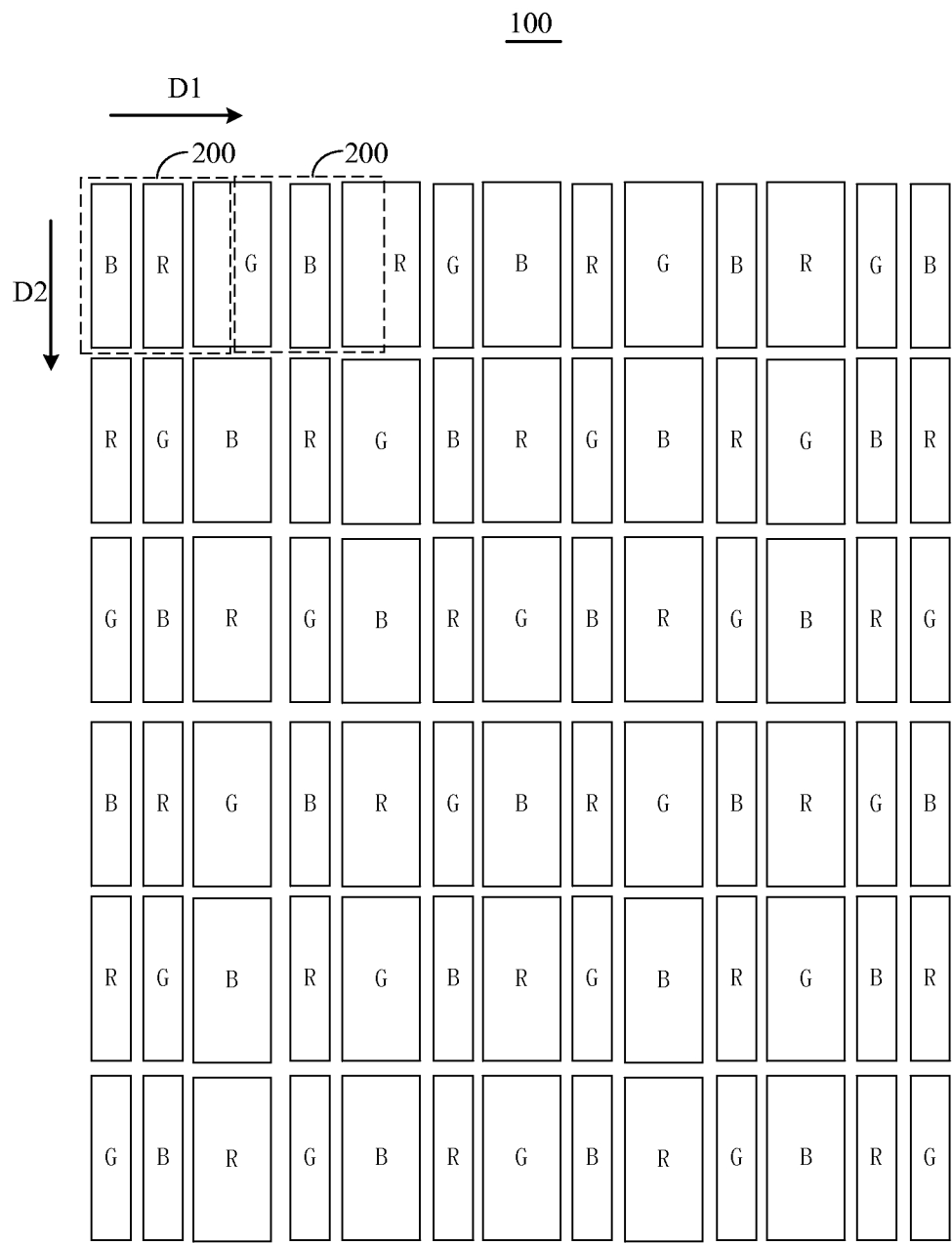
FIG. 3 is a schematic diagram of a pixel array according to a second embodiment of present disclosure.
Figure 4:
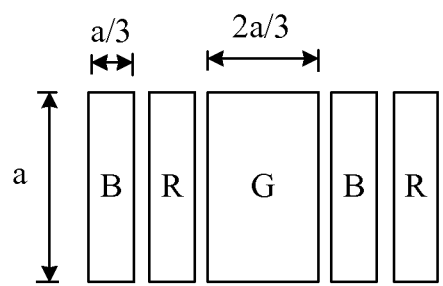
FIG. 4 is a size schematic diagram of each sub-pixel of a pix of a pixel array of FIG. 3.

Referring to FIG. 3, FIG. 3 is a schematic diagram of a pixel array according to a second embodiment of present disclosure. In the embodiment, there is no black matrix between the adjacent two sub-pixels in adjacent two pixels 200, and the adjacent two sub-pixels in adjacent two pixels 200 are connected to each other. In other words, the adjacent two sub-pixels having the same color are shared by the adjacent two pixels 200. Referring to FIG. 4, FIG. 4 is a size schematic diagram of each sub-pixel of a pix of a pixel array of FIG. 3. A length of each sub-pixel is a, and a width of each sub-pixel is a/3. Because the adjacent two sub-pixels having the same color are shared by the adjacent two pixels 200, thus the length of the adjacent two sub-pixels is a and the width of the adjacent two sub-pixels is 2a/3. A length of each sub-pixel is a, and a width of each sub-pixel is 2a/3 in the existing technology. An equivalent gray of the pixel which length is a and width is 2a/3 is present by G, then a formula 1 is described as follows.

$$L_0G_1^r + L_0G_2^r = 2L_0G^r \quad \text{(formula 1)}$$

Then a formula 2 is obtained, the formula 2 is described as follows.

$$G = \sqrt[r]{(G_1^r + G_2^r)/2} \quad \text{(formula 2)}$$

$L_0$ is a zero gray brightness of the blue sub-pixel, or a zero gray brightness of the green sub-pixel, or a zero gray brightness of the red sub-pixel. G1 and G2 are gray scales of the sub-pixels in the existing technology, r is a gray brightness response curve of human eyes, and a value of r is usually 2.2.

Preferably, a data line is located between the adjacent two sub-pixels having the same color of the adjacent two pixels 200, and the data line is configured to drive the adjacent two sub-pixels having the same color of the adjacent two pixels 200.

Preferably, the data line is located between the adjacent two sub-pixels having the same color of the adjacent two pixels 200, and the data line serves as a black matrix between the adjacent two sub-pixels having the same color of the adjacent two pixels 200.

Figure 5:
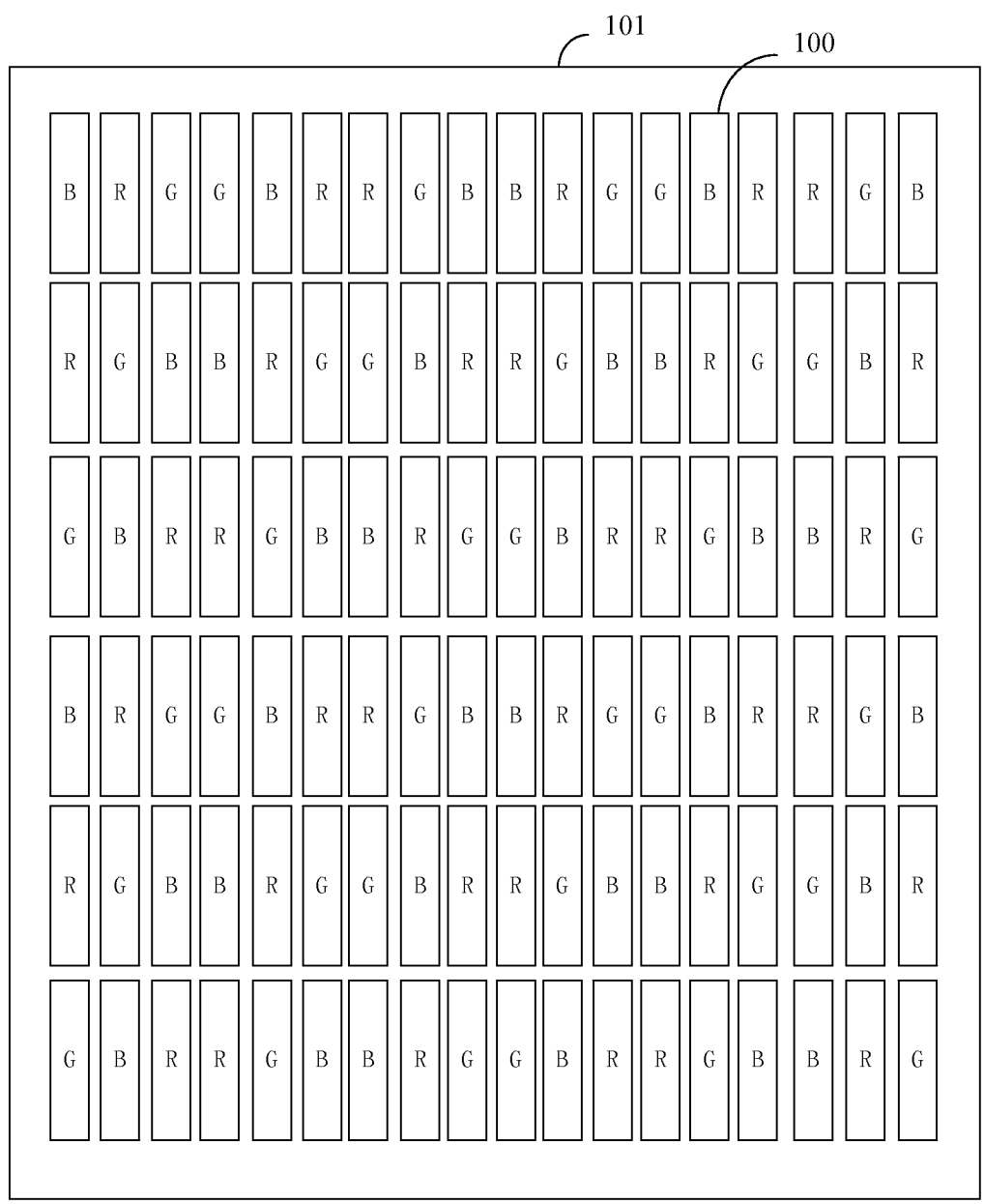
FIG. 5 is a schematic diagram of a display panel according to an embodiment of present disclosure.

A display panel is also provided in an embodiment of present disclosure. Referring to FIG. 5, FIG. 5 is a schematic diagram of a display panel according to an embodiment of present disclosure. The display panel 10 includes a substrate 101, and a pixel array 100 formed on the substrate 101.

Referring to FIG. 2. FIG. 2 is a schematic diagram of a pixel array according to a first embodiment of present disclosure. The pixel array 100 includes a plurality of pixels 200 which are distributed in matrix along a first direction D1 and a second direction D2. Each pixel 200 includes three sub-pixels having different colors. For a convenient description, the three sub-pixels having different colors are respectively named as a first color sub-pixel 201, a second color sub-pixel 202, and a third color sub-pixel 203. In the pixels 200 distributed in the first direction D1, adjacent two sub-pixels in adjacent two pixels have the same color, and the adjacent two sub-pixels having the same color in the adjacent two pixels share a data line. The adjacent two sub-pixels in adjacent two pixels have the same color means that a pixel is adjacent to another pixel, one sub-pixel of the pixel is adjacent to one sub-pixel of the adjacent pixel and has the same color as the sub-pixel of the adjacent pixel.

In the pixels 200 distributed in the second direction D2, any adjacent three sub-pixels form a pixel 200.

In an embodiment of present disclosure, the first direction D1 is a row direction and the second direction D2 is a column direction. In another embodiment of present disclosure, the first direction D1 is a column direction and the second direction D2 is a row direction. In the embodiment, the first color sub-pixel 201 is a blue sub-pixel, and the first color sub-pixel 201 is represented by a letter B for a convenient marking in FIG. 2. The second color sub-pixel 202 is a red sub-pixel, and the second sub-pixel 202 is represented by a letter R for a convenient marking in FIG. 2. The third color sub-pixel 203 is a green color sub-pixel, and the third sub-pixel 203 is represented by a letter G for a convenient marking in FIG. 2.

It is understood that in another embodiment, the first color sub-pixel 201 is a green sub-pixel, the second color sub-pixel 202 is a red sub-pixel, and the third color sub-pixel 203 is a blue sub-pixel. In yet another embodiment, the first color sub-pixel 201 is a green sub-pixel, the second color sub-pixel 202 is a blue sub-pixel, and the third color sub-pixel 203 is a red sub-pixel. And the first color sub-pixel 201, the second color sub-pixel 202, and the third color sub-pixel 203 are not limited to the above description, the first color sub-pixel 201, the second color sub-pixel 202, and the third color sub-pixel 203 can be other combinations of red sub-pixel, blue sub-pixel and green sub-pixel.

The pixel array 100 provided in the present disclosure is illustrated by take the resolution of the display panel is m*n for example. The letter m is a row number of the pixels of the display panel and the letter n is a column number of the pixels of the display panel. In the existing technology, the data line number required for driving the display panel is 3*n. In the embodiment of present disclosure, the date line number required for driving the display panel is 2*n+1, because the adjacent two sub-pixels having the same color in the adjacent two pixels share a date line. The letter n is a positive integer and n>1, thus, (2*n+1)<3*n. In present disclosure, the adjacent two sub-pixels of the adjacent two pixels are set as the same color, and the adjacent two sub-pixels having the same color of the adjacent two pixels are shared a data line. Thus, a data line number required for the display panel is reduced, and the aperture ratio of the display panel is improved.

In the first direction D1, the pixels 200 are periodically distributed by taking three pixels as a period. For a convenient description, the three pixels in a period are respectively named as a first pixel 300, a second pixel 400, and a third pixel 500. In the first row of the pixels, the first pixel 300 includes a first color sub-pixel 201, a second color sub-pixel 202, and a third color sub-pixel 203 orderly distributed along the first direction D1. The second pixel 400 includes a third color sub-pixel 203, a first color sub-pixel 201, and a second color sub-pixel 202 orderly distributed along the first direction D1. The third pixel 500 includes a second color sub-pixel 202, a third color sub-pixel 203, and a first color sub-pixel 201 orderly distributed along the first direction D1.

In the embodiment, the first color sub-pixel 201 is a blue sub-pixel B, the second color sub-pixel 202 is a red sub-pixel R, and the third color sub-pixel 203 is a green sub-pixel G. Thus, in the pixels of the first row, the first pixel 300 includes a blue sub-pixel B, a red sub-pixel R, and a green sub-pixel G orderly distributed along the first direction D1. The second pixel 400 includes a green sub-pixel G, a blue sub-pixel B, and a sub-pixel R orderly distributed along the first direction D1. The third pixel 500 includes a red sub-pixel R, a green sub-pixel G, and a blue sub-pixel B orderly distributed along the first direction D1. Moreover, the pixels 200 in the first row are periodically distributed by taking the first pixel 300, the second pixel 400, and the third pixel 500 as a period in the first direction D1. The pixels 200 in the second row are periodically distributed by taking the third pixel 500, the first pixel 300, and the second pixel 400 as a period in the first direction D1. Moreover, the third pixel 500 in the second row is corresponding to the first pixel 300 in the first row, that is, the third pixel 500 in the second row is in the same column with the first pixel 300 in the first row. The first pixel 300 in the second row is corresponding to the second pixel 400 in the first row, that is, the first pixel 300 in the second row is in the same column with the second pixel 400 in the first row. The second pixel 400 in the second row is corresponding to the third pixel 500 in the first row, that is, the second pixel 400 in the second row is in the same column with the third pixel 500 in the first row. The pixels 200 in the third row are periodically distributed by taking the second pixel 400, the third pixel 500, and the first pixel 300 as a period in the first direction D1, moreover, the second pixel 400 in the third row is corresponding to the first pixel 300 in the first row and the third pixel 500 in the second row, that is, the second pixel 400 in the third row is in the same column with the first pixel 300 in the first row and the third pixel 500 in the second row. The third pixel 500 in the third row is corresponding to the second pixel 400 in the first row and the first pixel 300 in the second row, that is, the third pixel 500 in the third row is in the same column with the second pixel 400 in the first row and the first pixel 300 in the second row. The first pixel 300 in the third row is corresponding to the third pixel 500 in the first row and the second pixel 400 in the second row, that is, the first pixel 300 in the third row is in the same column with the third pixel 500 in the first row and the second pixel 400 in the second row.

In the second direction D2, the pixels 200 are periodically distributed by taking three rows as a period. For a convenient description, the three rows in a period are respectively named as a first pixel row 600, a second pixel row 700, and a third pixel row 800. That is, the pixels 200 are periodically distributed by taking the first pixel row 600, the second pixel row 700, and the third pixel row 800 as a period in the second direction D2.

The first color sub-pixel 201 of the pixel 200 in the first pixel row 600 is corresponding to the second color sub-pixel 202 of the pixel 200 in the second pixel row 700 and the third color sub-pixel 203 of the pixel 200 in the third pixel row 800 in the second direction D2, and the first color sub-pixel 201 of the pixel 200 in the first pixel row 600, the second color sub-pixel 202 of the pixel 200 in the second pixel row 700 and the third color sub-pixel 203 of the pixel 200 in the third pixel row 800 form a pixel 200 in the second direction D2. In the embodiment, the first color sub-pixel 201 of the pixel 200 in the first pixel 600 is in the same column with the second color sub-pixel 202 of the pixel 200 in the second pixel row 700 and the third color sub-pixel 203 of the pixel 200 in the third pixel row 800. The second color sub-pixel 202 of the pixel 200 in the first pixel row 600 is corresponding to the third color sub-pixel 203 of the pixel 200 in the second pixel row 700 and the first color sub-pixel 201 of the pixel 200 in the third pixel row 800 in the second direction D2, and the second color sub-pixel 202 of the pixel 200 in the first pixel row 600, the third color sub-pixel 203 of the pixel 200 in the second pixel row 700 and the first color sub-pixel 201 of the pixel 200 in the third pixel row 800 form a pixel 200 in the second direction D2. In the embodiment, the second color sub-pixel 202 of the pixel 200 in the first pixel row 600 is in the same column with the third color sub-pixel 203 of the pixel 200 in the second pixel row 700 and the first color sub-pixel 201 of the pixel 200 in the third pixel row 800. The third color sub-pixel 203 of the pixel 200 in the first pixel row 600 is corresponding to the first color sub-pixel 201 of the pixel 200 in the second pixel row 700 and the second color sub-pixel 202 of the pixel 200 in the third pixel row 800 in the second direction D2, and the third color sub-pixel 203 of the pixel 200 in the first pixel row 600, the first color sub-pixel 201 of the pixel 200 in the second pixel row 700 and the second color sub-pixel 202 of the pixel 200 in the third pixel row 800 form a pixel 200 in the second direction D2. In the embodiment, the third color sub-pixel 203 of the pixel 200 in the first pixel row 600 is in the same column with the first color sub-pixel 201 of the pixel 200 in the second pixel row 700 and the second color sub-pixel 202 of the pixel 200 in the third pixel row 800.

Referring to FIG. 3, FIG. 3 is a schematic diagram of a pixel array according to a second embodiment of present disclosure. In the embodiment, there is no black matrix between the adjacent two sub-pixels in adjacent two pixels 200, and the adjacent two sub-pixels in adjacent two pixels 200 are connected to each other. In other words, the adjacent two sub-pixels having the same color are shared by the adjacent two pixels 200. Referring to FIG. 4, FIG. 4 is a size schematic diagram of each sub-pixel of a pix of a pixel array of FIG. 3. A length of each sub-pixel is a, and a width of each sub-pixel is a/3. Because the adjacent two sub-pixels having the same color are shared by the adjacent two pixels 200, thus the length of the adjacent two sub-pixels is a and the width of the adjacent two sub-pixels is 2a/3. A length of each sub-pixel is a, and a width of each sub-pixel is 2a/3 in the existing technology. An equivalent gray of the pixel which length is a and width is 2a/3 is present by G, then a formula 1 is described as follows.

$$L_0 G_1^r + L_0 G_2^r = 2 L_0 G^r \quad \text{(formula 1)}$$

Then a formula 2 is get, the fornula 2 is described as follows.

$$G = \sqrt[r]{(G_1^r + G_2^r)/2} \quad \text{(formula 2)}$$

$L_0$ is a zero gray brightness of the blue sub-pixel, or a zero gray brightness of the green sub-pixel, or a zero gray brightness of the red sub-pixel. G1 and G2 are gray scales of the sub-pixels in the existing technology, r is a gray brightness response curve of human eyes, and a value of r is usually 2.2.

Preferably, a data line is located between the adjacent two sub-pixels having the same color of the adjacent two pixels 200, and the data line is configured to drive the adjacent two sub-pixels having the same color of the adjacent two pixels 200.

Preferably, the data line is located between the adjacent two sub-pixels having the same color of the adjacent two pixels 200, and the data line serves as a black matrix between the adjacent two sub-pixels having the same color of the adjacent two pixels 200.

A display device is provided in an embodiment of present disclosure. The display device includes a display panel 10. The display panel 10 includes a substrate 101, and a pixel array 100 formed on the substrate 101. The display panel 10 included in the display device is the same as the display panel described above. And the display panel 10 includes the pixel array 100 described above, and the display panel 10 and the pixel array 100 are not repeated here.

In the pixel array, the display panel, and the display device provided in the embodiments of present disclosure, the adjacent two sub-pixels in the adjacent two pixels have the same color, and the adjacent two sub-pixels having the same color in the adjacent two pixels shares a data line. The adjacent two sub-pixels having the same color in the adjacent two pixels 200 of the pixel array 100, and the adjacent two sub-pixels having the same color in the adjacent two pixels 200 shares a date line. Thus, compared with the existing technology, a data line number required for the display panel for the display panel is reduced, and the aperture ratio of the display panel is improved.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A pixel array, comprising: a plurality of pixels distributed in matrix along a first direction and a second direction, each pixel comprising three sub-pixels having different colors, the three sub-pixels being respectively named a first color sub-pixel, a second color sub-pixel, and a third color sub-pixel, in the pixels distributed in the first direction, adjacent two sub-pixels in adjacent two pixels having the same color, and the adjacent two sub-pixels having the same color in the adjacent two pixels sharing a data line;
    wherein in the pixels distributed in the second direction, any adjacent three sub-pixels form a pixel; and
    wherein the pixels are periodically distributed by taking three pixels as a period in the first direction, the three pixels in a period are respectively named as a first pixel, a second pixel, and a third pixel, the first pixel comprises a first color sub-pixel, a second color sub-pixel, and a third color sub-pixel orderly distributed along the first direction; the second pixel comprises a third color sub-pixel, a first color sub-pixel, and a second color sub-pixel orderly distributed along the first direction; the third pixel comprises a second color sub-pixel, a third color sub-pixel, and a first color sub-pixel orderly distributed along the first direction.

2. The pixel array according to claim 1, wherein the pixels are periodically distributed by taking three rows as a period in the second direction, the three rows in a period are respectively named as a first pixel row, a second pixel row, and a third pixel row, the first color sub-pixel of the pixel in the first pixel row is corresponding to the second color sub-pixel of the pixel in the second pixel row and the third color sub-pixel of the pixel in the third pixel row in the second direction, and the first color sub-pixel of the pixel in the first pixel row, the second color sub-pixel of the pixel in the second pixel row and the third color sub-pixel of the pixel in the third pixel row forms a pixel in the second direction; the second color sub-pixel of the pixel in the first pixel row is corresponding to the third color sub-pixel of the pixel in the second pixel row and the first color sub-pixel of the pixel in the third pixel row in the second direction, and the second color sub-pixel of the pixel in the first pixel row, the third color sub-pixel of the pixel in the second pixel row and the first color sub-pixel of the pixel in the third pixel row forms a pixel in the second direction; the third color sub-pixel of the pixel in the first pixel row is corresponding to the first color sub-pixel of the pixel in the second pixel row and the second color sub-pixel of the pixel in the third pixel row in the second direction, and the third color sub-pixel of the pixel in the first pixel row, the first color sub-pixel of the pixel in the second pixel row and the second color sub-pixel of the pixel in the third pixel row forms a pixel in the second direction.

3. The pixel array according to claim 1, wherein a black matrix is set between the adjacent two sub-pixels having the same color, and the data line is corresponding to the black matrix set between the adjacent two sub-pixels having the same color.

4. The pixel array according to claim 1, wherein there is no black matrix between the adjacent two sub-pixels in the adjacent two pixels, and the adjacent two sub-pixels in the adjacent two pixels are connected to each other.

5. The pixel array according to claim 4, wherein the data line is located between the adjacent two sub-pixels having the same color of the adjacent two pixels.

6. A display panel, comprising: a substrate and a pixel array formed on the substrate, the pixel array comprising a plurality of pixels distributed in matrix along a first direction and a second direction, each pixel comprising three sub-pixels having different colors, the three sub-pixels being respectively named a first color sub-pixel, a second color sub-pixel, and a third color sub-pixel, in the pixels distributed in the first direction, adjacent two sub-pixels in adjacent two pixels having the same color, and the adjacent two sub-pixels having the same color in the adjacent two pixels sharing a line;
wherein in the pixels distributed in the second direction, any adjacent three sub-pixels form a pixel; and
wherein the pixels are periodically distributed by taking three pixels as a period in the first direction, the three pixels in a period are respectively named as a first pixel, a second pixel, and a third pixel, the first pixel comprises a first color sub-pixel, a second color sub-pixel, and a third color sub-pixel orderly distributed along the first direction; the second pixel comprises a third color sub-pixel, a first color sub-pixel, and a second color sub-pixel orderly distributed along the first direction; the third pixel comprises a second color sub-pixel, a third color sub-pixel, and a first color sub-pixel orderly distributed along the first direction.

7. The display panel according to claim 6, wherein the pixels are periodically distributed by taking three rows as a period in the second direction, the three rows in a period are respectively named as a first pixel row, a second pixel row, and a third pixel row, the first color sub-pixel of the pixel in the first pixel row is corresponding to the second color sub-pixel of the pixel in the second pixel row and the third color sub-pixel of the pixel in the third pixel row in the second direction, and the first color sub-pixel of the pixel in the first pixel row, the second color sub-pixel of the pixel in the second pixel row and the third color sub-pixel of the pixel in the third pixel row forms a pixel in the second direction; the second color sub-pixel of the pixel in the first pixel row is corresponding to the third color sub-pixel of the pixel in the second pixel row and the first color sub-pixel of the pixel in the third pixel row in the second direction, and the second color sub-pixel of the pixel in the first pixel row, the third color sub-pixel of the pixel in the second pixel row and the first color sub-pixel of the pixel in the third pixel row forms a pixel in the second direction; the third color sub-pixel of the pixel in the first pixel row is corresponding to the first color sub-pixel of the pixel in the second pixel row and the second color sub-pixel of the pixel in the third pixel row in the second direction, and the third color sub-pixel of the pixel in the first pixel row, the first color sub-pixel of the pixel in the second pixel row and the second color sub-pixel of the pixel in the third pixel row forms a pixel in the second direction.

8. The display panel according to claim 6, wherein there is no black matrix between the adjacent two sub-pixels in the adjacent two pixels, and the adjacent two sub-pixels in the adjacent two pixels are connected to each other.

9. The display panel according to claim 8, wherein the data line is located between the adjacent two sub-pixels having the same color of the adjacent two pixels.

10. A display device, comprising a display panel, the display panel comprising a substrate and a pixel array formed on the substrate, the pixel array comprising a plurality of pixels distributed in matrix along a first direction and a second direction, each pixel comprising three sub-pixels having different colors, the three sub-pixels being respectively named a first color sub-pixel, a second color sub-pixel, and a third color sub-pixel, in the pixels distributed in the first direction, adjacent two sub-pixels in adjacent two pixels having the same color, and the adjacent two sub-pixels having the same color in the adjacent two pixels sharing a data line;
wherein in the pixels distributed in the second direction, any adjacent three sub-pixels form a pixel; and
wherein the pixels are periodically distributed by taking three pixels as a period in the first direction, the three pixels in a period are respectively named as a first pixel, a second pixel, and a third pixel, the first pixel comprises a first color sub-pixel, a second color sub-pixel, and a third color sub-pixel orderly distributed along the first direction; the second pixel comprises a third color sub-pixel, a first color sub-pixel, and a second color sub-pixel orderly distributed along the first direction; the third pixel comprises a second color sub-pixel, a third color sub-pixel, and a first color sub-pixel orderly distributed along the first direction.

11. The display device according to claim 10, wherein the pixels are periodically distributed by taking three rows as a period in the second direction, the three rows in a period are respectively named as a first pixel row, a second pixel row, and a third pixel row, the first color sub-pixel of the pixel in the first pixel row is corresponding to the second color sub-pixel of the pixel in the second pixel row and the third color sub-pixel of the pixel in the third pixel row in the second direction, and the first color sub-pixel of the pixel in the first pixel row, the second color sub-pixel of the pixel in the second pixel row and the third color sub-pixel of the pixel in the third pixel row forms a pixel in the second direction; the second color sub-pixel of the pixel in the first pixel row is corresponding to the third color sub-pixel of the pixel in the second pixel row and the first color sub-pixel of the pixel in the third pixel row in the second direction, and the second color sub-pixel of the pixel in the first pixel row, the third color sub-pixel of the pixel in the second pixel row and the first color sub-pixel of the pixel in the third pixel row forms a pixel in the second direction; the third color sub-pixel of the pixel in the first pixel row is corresponding to the first color sub-pixel of the pixel in the second pixel row and the second color sub-pixel of the pixel in the third pixel row in the second direction, and the third color sub-pixel of the pixel in the first pixel row, the first color sub-pixel of the pixel in the second pixel row and the second color sub-pixel of the pixel in the third pixel row forms a pixel in the second direction.

12. The display device according to claim 10, wherein there is no black matrix between the adjacent two sub-pixels in the adjacent two pixels, and the adjacent two sub-pixels in the adjacent two pixels are connected to each other.

13. The display device according to claim 12, wherein the data line is located between the adjacent two sub-pixels having the same color of the adjacent two pixels.

* * * * *